May 24, 1960   S. G. KRUMBHOLZ ET AL   2,937,824
BI-MEDIUM ROCKET-TORPEDO MISSILE

Filed July 11, 1955   4 Sheets-Sheet 1

INVENTOR.
STANLEY G. KRUMBHOLZ
GEORGE M. MCROBERTS III
BY
ATTORNEY

INVENTOR.
STANLEY G. KRUMBHOLZ
GEORGE M. MCROBERTS III
BY
ATTORNEY

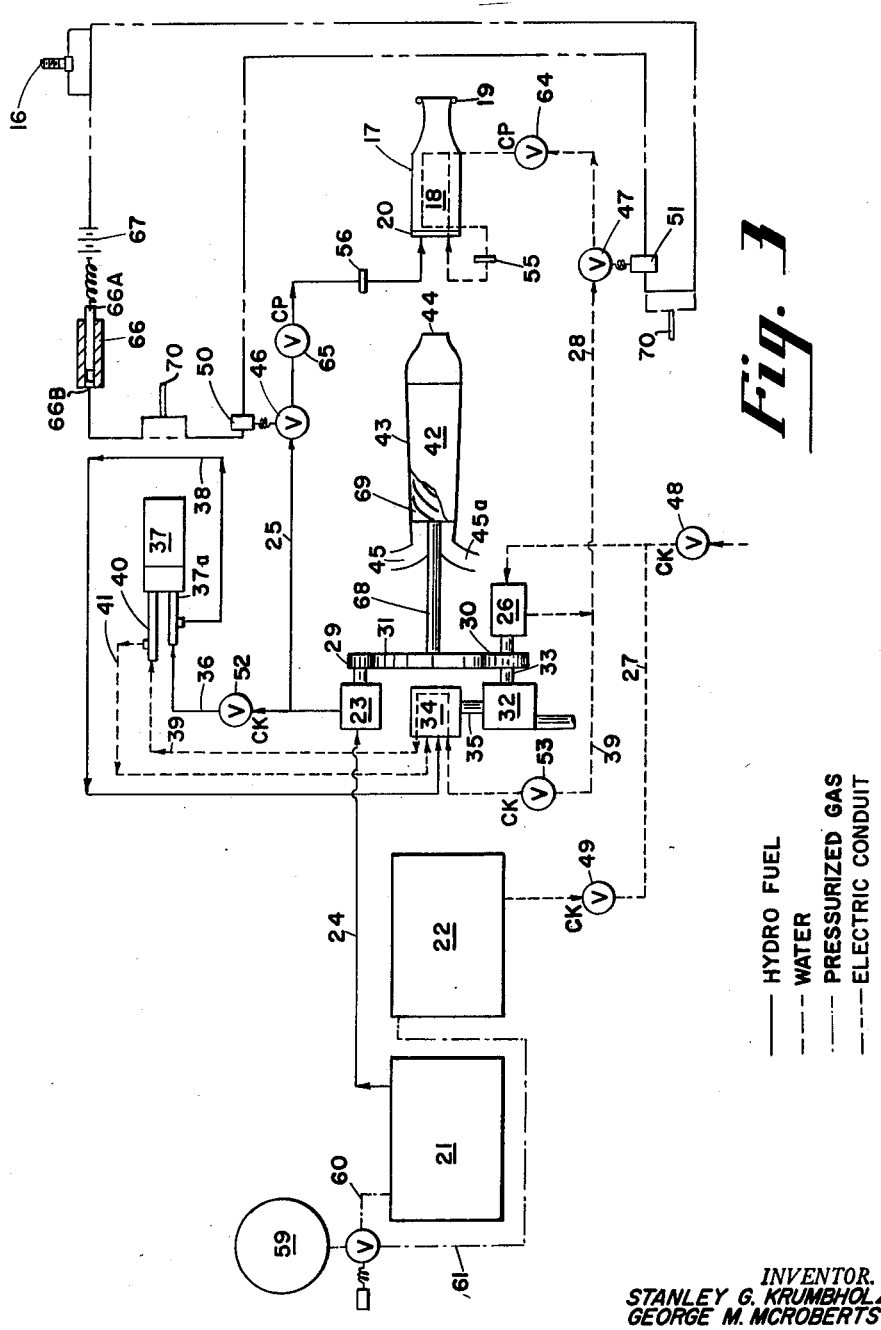

May 24, 1960 S. G. KRUMBHOLZ ET AL 2,937,824
BI-MEDIUM ROCKET-TORPEDO MISSILE
Filed July 11, 1955 4 Sheets-Sheet 4
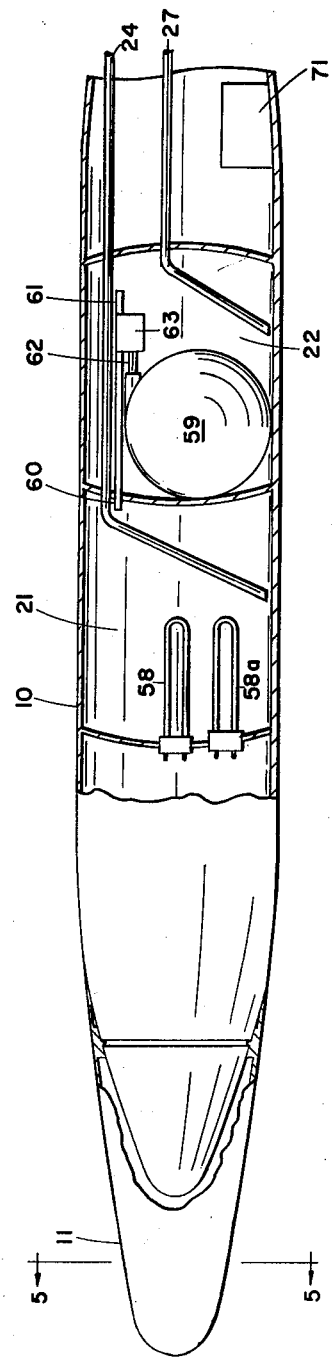
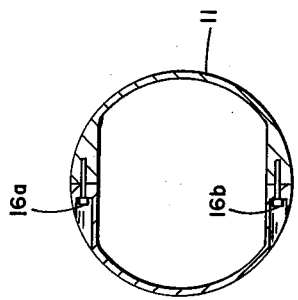
INVENTOR.
STANLEY G. KRUMBHOLZ
GEORGE M. MC ROBERTS III
BY
ATTORNEY United States Patent Office 2,937,824
Patented May 24, 1960

2,937,824
BI-MEDIUM ROCKET-TORPEDO MISSILE

Stanley G. Krumbholz, Glendora, and George M. McRoberts III, Sierra Madre, Calif., assignors to Aerojet-General Corporation, Azusa, Calif., a corporation of Ohio Filed July 11, 1955, Ser. No. 520,955
8 Claims. (Cl. 244—14)

This invention relates to a bi-medium vehicle operable through both air and water, and has for its principal object to provide such a vehicle capable of being propelled from one of the two media, air and water, into and through the other. A related object is to launch such a vessel in air, direct it into water and then propel it through the water.

Propelled devices operable either through air alone or through water alone are known. However, it is desirable for some purposes to propel a vehicle such as a plane or a missile through the air for a distance, then cause it to enter water and to continue its propulsion through the water. The objects of this invention are carried out by use of a rocket motor for propulsion while the missile is in flight and a pumpjet operated by a gas driven turbine powered by a propellant effective for the propulsion through the water medium. The turbine is utilized to drive the rocket motor auxiliaries during propulsion through the air medium.

A feature of the arrangement resides in a means for disconnecting from the vessel the parts especially adapted for air operation but which are not adapted or used for water operation. The foregoing and other features will be better understood from the following detailed description and the accompanying drawings of which:

Fig. 3 is a schematic view of the power plant used in the vessel of Figs. 1 and 2.

Fig. 4 is a sectional view of the nose portion and main housing.

Fig. 5 is a sectional view taken along the line 5—5 of Fig. 4.

Figure 1:
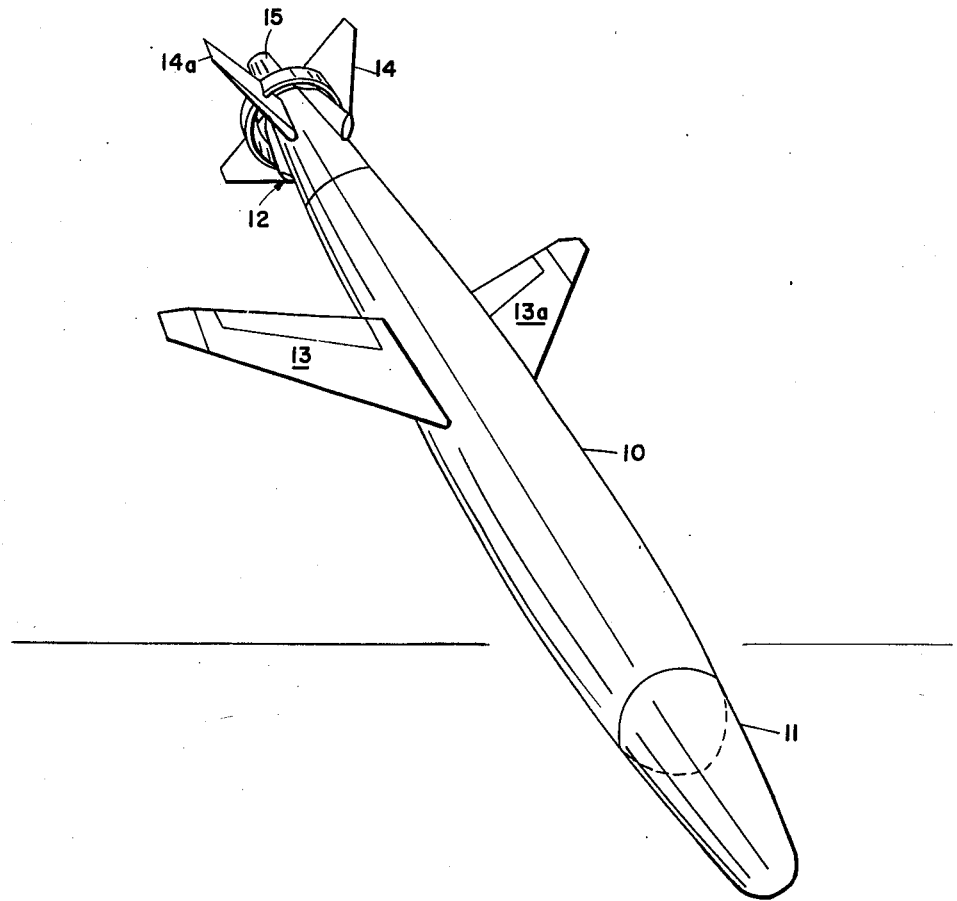
Fig. 1 is a perspective view of a vessel, according to this invention, in flight.
Figure 2:
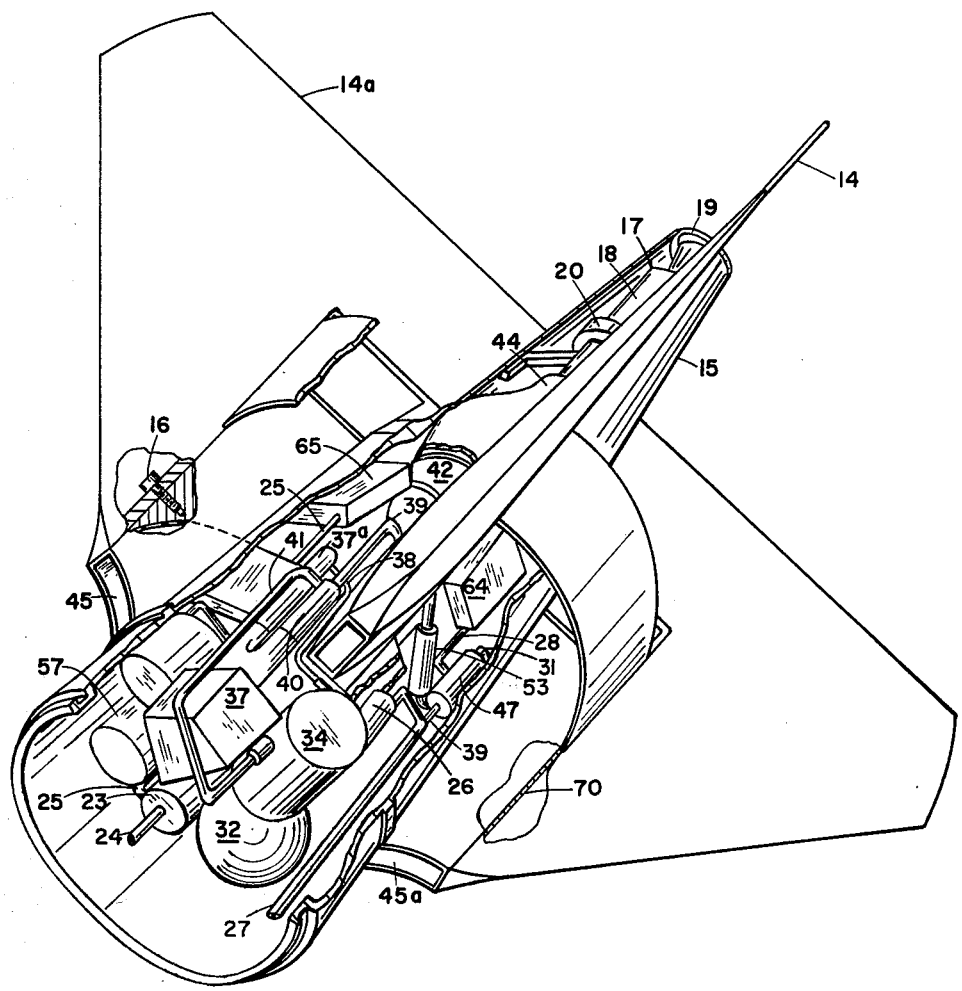
Fig. 2 is an isometric view showing the power plant in the tail portion of the vessel of Fig. 1.

Referring to Figs. 1 to 3, the vessel or vehicle comprises a streamlined housing 10 provided with a nose portion 11 and a tail portion 12. To provide for flight through the air, the housing is provided with usual wings 13 and 13a and tail fins 14 and 14a. The rear part 15 of the tail portion is held on the frame by the tail fins 14 and 14a, which together with wings 13 and 13a, and nose section 11 are made detachable from the remainder by reason of explosive bolts such as 16, 16a, and 16b, which upon being exploded, throw off the detachable sections and streamline the missile for underwater propulsion. The portion 15 contains a rocket motor 17 comprising a combustion chamber 18, an exhaust nozzle 19 and a propellant injector head 20. The propellant for the rocket motor is contained in tanks 21 and 22, the tank 21 containing a fuel and the tank 22 containing an oxidizer for the fuel. The fuel is pumped into the injector head of the rocket chamber by a fuel pump 23, through conduits 24 and 25. The oxidizer is pumped to the injector head of the rocket chamber by a pump 26 through conduits 27 and 28.

The two pumps 23 and 26 are operated in unison by respective pinions 29 and 30 which are intermeshed by a gear 31; and the gear train is driven by a gas turbine 32 having the pinion 30 on its shaft 33. The turbine is driven by a gas generator comprising chamber 34 and provided with a gas outlet 35 leading to the turbine 32. The gas generator is operated by combustion of fuel and oxidizer from tanks 21 and 22; and for this purpose some of the fuel pumped by pump 23 is sent through conduit 36 and through metering valve 37a into a conduit 38 which carries the fuel into the gas generator chamber. Similarly, some of the oxidizer from the pump 26 is brought through conduit 39 to the metering valve 40, and thence through conduit 41 to the gas generator. For cooling purposes, the oxidizer conduits may be carried in cooling relationship with the gas generator as indicated schematically in Fig. 3.

Within the undetachable part of tail portion 12, there is fitted a jet pump 42 comprising an impeller wheel 69 mounted on shaft 68 which is driven by gear 31 mounted in a chamber 43 having an exhaust nozzle 44 and provided with water inlet conduits 45 and 45a which lead to the exterior of the housing through the fin 14a.

The chemicals used as the propellant fuel or reactant are preferably substances which react violently with water, are thermally stable, capable of withstanding shock and which are preferably not spontaneously inflammable in air. These compositions, if high melting, should be able to withstand grinding and in every case should preferably be noncorrosive. They should produce large volumes of gases per unit mass of chemical and should have a high heat of reaction in order to evaporate as much water as possible. It is also desirable that they react instantaneously with water so that all gas will be formed in the region of highest pressure.

Suitable reactants are the alkali metal borohydrides, alkaline earth metal borohydrides, other metal borohydrides, metal hydrides, metal silicides, and borohydrides and metal alloys which combine violently with water giving off gas and heat. Also useful are such substances as $LiBH_4$, $Al(BH_4)_3$, $LiH$, $B_2H_6$, and other higher boron hydrides. Other substances which may be used are, for example, molten water reactive metals and metal alloys such as molten Li, molten Mg, amalgamated Al, NaH, Na—K alloy, $CaH_2$, $Be(BH_4)_2$, $NaBH_4$, activated boron and activated silicon. The silicon and boron fuels are activated by alloying them with substances that make them water reactive. The propellant fuel is injected into the gas generating chamber 34 simultaneously with the oxidizer, which is preferably water thereby producing gases, heat and steam from the chemical reaction, which in turn drive the turbine which drives the pumps 23 and 26 injecting propellant and oxidizer into the combustion chamber of the rocket motor and produce the exhaust jet which through its mechanical reaction generates useful thrust. The valves 37a and 40 are operated by a device 37 which varies the mixture ratio of fuel and oxidizer and the total flow rates thereof.

Molten lithium has been found to be the preferred fuel in the practice of this invention.

Where the propellant is solid, a paste may be prepared by incorporating reactant material which has been ground to a size of approximately 100 angstroms in radius and incorporating this powder in substances such as crystal oil, carbon tetrachloride, gasoline or saturated hydrocarbons. The material may be ground to this fineness in a colloid mill or other suitable apparatus. Any carrying medium used must be absolutely free of water. Grinding shall preferably be performed in one of the above mediums.

The device of this invention is particularly adapted to submarine destruction, and hence space for an explosive charge as well as electronic means for seeking and destroying the target is provided in the missile. The general design of the missile provides a high degree of versatility in that it may be launched either from surface craft or aircraft to seek and destroy submerged vessels. In launching from surface craft, a booster is usually necessary, however, when launched from the air, the speed of the aircraft will obviate the necessity of any such booster.

If there is used a hydrofuel which is solid at normal temperatures, some means for melting the fuel must be provided, such as electric heating coils 58 and 58a embedded in the fuel. These may be activated either from batteries within the missile or the heating coils may be energized by some external power source before the missile is launched. Preferably, the missile is well insulated against loss of heat to reduce the amount of heat required to be furnished by the coils 58 and 58a.

In operation, fuel and oxidizer are transferred from the main tanks or from starting tanks by a means such as pressurized gas flowing from cylinder 59, through gas conduits 60 and 61. Valve 62 operated by solenoid 63 is provided to regulate pressurization of the fuel and oxidizer tanks into the gas generator where it is contacted with water or other suitable oxidizer. The gases produced from the resultant hypergolic combustion are impinged upon the blades of turbine 32 which operates the fuel pump 23 and the oxidizer pump 26. When the fuel and oxidizer pumps reach a predetermined discharge pressure, burst diaphragms 55 and 56 give way and oxidizer and fuel are directed into the rocket chamber where combustion of the two components results in the production of large quantities of gases which in turn deliver the desired thrust upon discharge through exhaust nozzle 19 to power the missile while in flight through air.

In order to avoid waste in fuel consumption it is desirable to have the oxidizer, which when operating submerged in water, reach the rocket motor combustion chamber prior to the entry of fuel. To insure this result valve 46 is provided in fuel line 25 suitably loaded to prohibit the opening of the fuel line until such time as a predetermined pressure is built up in the oxidizer line 28.

Constant pressure valves 64 and 65 are provided to maintain the proper mixing ratio of fuel to oxidizer during this air borne phase of operation.

Cooling may be accomplished in an effective manner simply by routing water used as the oxidizer around both the gas generator and the rocket motor combustion chamber as shown.

Valving operations to shut off the fuel and oxidizer lines leading to the rocket motor when jettisoning the rocket motor can be effected most expeditiously by electro-mechanical devices such as solenoids 50 and 51. In order to provide electric power for such valving operations in flight, batteries 67 or an electric generator 57 may be provided, as illustrated. Power for operating such an electric generator is obtained from the gas turbine.

Upon completion of the air trajectory and entry into the water, the rocket motor, rear tail section and wings are separated from the main body of the missile. The separation may be accomplished by the sudden check to the speed of the missiles on entering the water either by purely mechanical means or by explosive bolts 16, 16a and 16b. Explosive cord 70, such as primacord placed in grooves cut into those parts which are to be detached, may be used in place of the explosive bolts.

An impulse originating from an inertia trip 66 may be utilized to detonate the explosives. Such an inertia trip may be comprised of a rod of conductive material 66a connected in the circuit supplied by battery 67 and arranged in a bore in a block of insulating material carrying a terminal 66b from which the rod is spaced, and arranged so that the change of inertia of the rod on the sudden check in speed upon entry of the missile into the water will cause the rod to move forward and complete an electrical circuit by making contact with terminal 66b. The same trip is also used to shut down the fuel and oxidizer lines to the rocket power plant by actuating solenoids 50 and 51 to close valves 46 and 47. The pipes 25, 28 are connected to the rocket motor injection plate by conventional quick disconnect fittings positioned aft of the valves 64 and 65. Electrical power for these operations can be obtained either from a generator 57 or from batteries 67 or from both the batteries and the generator.

At this time because of the ram pressure of water in the intakes 45 and 45a, check valve 48 opens and check valve 49 closes thereby stopping the flow of water from water tank 22 and initiating the flow of free water from the exterior of the craft.

After water entry as well as during flight the flow ratio of fuel and oxidizer to the gas generator 34 is regulated by metering valves 37 and 40.

Check valves 52 and 53 may be provided in fuel line 36 and oxidizer line 28, as illustrated in Fig. 3 to prohibit back flow from the gas generator. During air flight, the jet pump, although its impeller wheel 69 is rotated by the gas turbine 32, performs no useful service.

During the water trajectory the device operates primarily as a pumpjet. During this phase the gas generator continues operation and as the turbine comes up to speed, the pumpjet begins to operate, inducting water through inlet conduits 45 and 45a and discharging a high velocity water jet through exhaust nozzle 44, thereby propelling the missile through the water at high velocity. The water pump during this phase pumps free water from outside the missile. Thus, it is necessary for the missile to carry only sufficient water for combustion during the air trajectory, thereby considerably decreasing the initial overall weight of the missile.

Space for aerial homing equipment is provided within the detachable nose section 11 while space for underwater homing equipment is provided within the main housing 10.

Space for conventional depth and roll control equipment 71 is provided within the housing 10, as shown in Fig. 4, to maintain the missile in an upright attitude.

We claim:

1. A bi-medium vessel adapted to travel through both air and water comprising: a rocket motor for driving the vessel through air, a water pump for driving the vessel through water, a fuel source, an oxidizer source, conduits leading from the fuel and oxidizer sources to the rocket motor, pumping means connected with the conduits adapted to pump the fuel and oxidizer to the rocket motor, a gas turbine driving the pumping means, a gas generator operatively connected to drive the turbine, and conduits connecting the fuel and oxidizer sources to the gas generator, said water pump being driven from the turbine; and valve means effective to close the conduits for the flow of fuel and oxidizer to the rocket motor when the vessel enters the water.

2. A bi-medium vessel according to claim 1 having means for detaching the rocket motor from the vessel upon entering into water.

3. A bi-medium vessel adapted to travel through both air and water comprising: a rocket motor for driving the vessel through air, a water pump for driving the vessel through water, a liquid lithium source, a water source, conduits leading from said lithium and water sources to the rocket motor, pumping means connected with said conduits adapted to pump said lithium and water to the rocket motor, a gas turbine driving the pumping means, a gas generator operatively connected to drive the turbine, conduits connecting the lithium and water sources to the gas generator, aerial stabilizing means attached to the outside of the vessel, means operated by the entry of the vessel into water for detaching the rocket motor and aerial stabilizing means from the vessel, valving means connected to said conduits adapted to control the flow of lithium and water to both the rocket motor and the gas generator, valve control means connected to said valving means adapted to stop the flow of lithium and water to the rocket motor upon entry into the water and valving means connected to said water conduit adapted to permit the flow of water from outside the vessel into the gas generator.

4. A bi-medium vessel according to claim 3 wherein the flow of lithium and water to the gas generator is regulated by metering valves connected to said lithium and water conduits.

5. A bi-medium vessel according to claim 3 wherein a source of pressurized gas is connected by conduits to the said lithium and water sources to perform the initial pumping of lithium and water into the gas generator.

6. A bi-medium vessel according to claim 5 wherein said gas conduit is connected to valving means provided to control the flow of pressurized gas into the lithium and water sources.

7. A bi-medium vessel according to claim 3 wherein an inertia trip impulse connected by electrical conduit to said valving means and to explosive means is provided to regulate the opening and closing of valves, the detachment of the rocket motor and the detachment of the said aerial stabilizing means upon entry into the water.

8. A bi-medium vessel according to claim 3 wherein an inertia trip impulse is connected by electrical conduit to said valving means and to explosive means in juxtaposition with said aerial stabilizing means and said rocket motor to regulate the opening and closing of valves and the detachment of said aerial stabilizing means and said rocket motor upon entry of said bi-medium vessel into water.

No references cited.